(12) United States Patent
Everett et al.

(10) Patent No.: US 6,439,455 B1
(45) Date of Patent: Aug. 27, 2002

(54) VALUE TRANSFER SYSTEM

(75) Inventors: David Barrington Everett, Brighton; John Viner, Wyndlesham; Alan Bailey, Sutton, all of (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 09/611,867

(22) Filed: Jul. 7, 2000

Related U.S. Application Data

(63) Continuation of application No. 08/945,583, filed as application No. PCT/GB96/01104 on May 9, 1996, now abandoned.

(30) Foreign Application Priority Data

May 11, 1995 (GB) .............................................. 9509582

(51) Int. Cl.[7] .............................................. G06F 17/60
(52) U.S. Cl. ........................ 235/379; 235/380; 705/41
(58) Field of Search ................................ 235/379, 380, 235/492; 705/41, 44; 902/26, 39, 40

(56) References Cited

U.S. PATENT DOCUMENTS

| | | | | |
|---|---|---|---|---|
| 4,319,336 A | * | 3/1982 | Anderson et al. | 235/380 X |
| 4,454,414 A | * | 6/1984 | Benton | 705/41 |
| 4,656,342 A | | 4/1987 | Ugon | 235/379 |
| 4,766,293 A | | 8/1988 | Boston | 395/241 |
| 5,351,294 A | * | 9/1994 | Matsumoto et al. | 380/228 |
| 5,461,217 A | | 10/1995 | Claus | 235/380 |
| 5,729,717 A | | 3/1998 | Tamada et al. | 711/164 |
| 6,289,324 B1 | * | 9/2001 | Kawan | 705/41 |

FOREIGN PATENT DOCUMENTS

| | | | | |
|---|---|---|---|---|
| EP | 0114773 A2 | 8/1984 | | G07F/7/10 |
| EP | 0256768 A2 | 2/1988 | | G07F/7/10 |
| EP | 0360613 A2 | 3/1990 | | G07F/17/34 |
| EP | 0555683 | 8/1993 | | G07F/17/32 |
| EP | 0619565 A1 | 10/1994 | | G07B/17/00 |
| JP | 10-188084 A | * | 7/1998 | |
| WO | 8303018 | 9/1983 | | G07F/7/10 |
| WO | 9310503 | 5/1993 | | G07F/15/30 |

* cited by examiner

Primary Examiner—Thien M. Le
Assistant Examiner—Jared J. Fureman
(74) Attorney, Agent, or Firm—Volpe and Koenig, P.C.

(57) ABSTRACT

The invention is concerned with systems for transferring value between electronic purses, usually in the form of IC or "Smart" cards, via the intermediary of an interface device. In order to control the flow of value between purses a hierarchical class structure is proposed. This is achieved by assigning to each purse a class which controls the conditions under which value may be transferred to and from (mainly from) a purse. Thus each purse stores in memory a representation of its own class, together with a list of those classes to which the purse can transfer value.

14 Claims, 1 Drawing Sheet

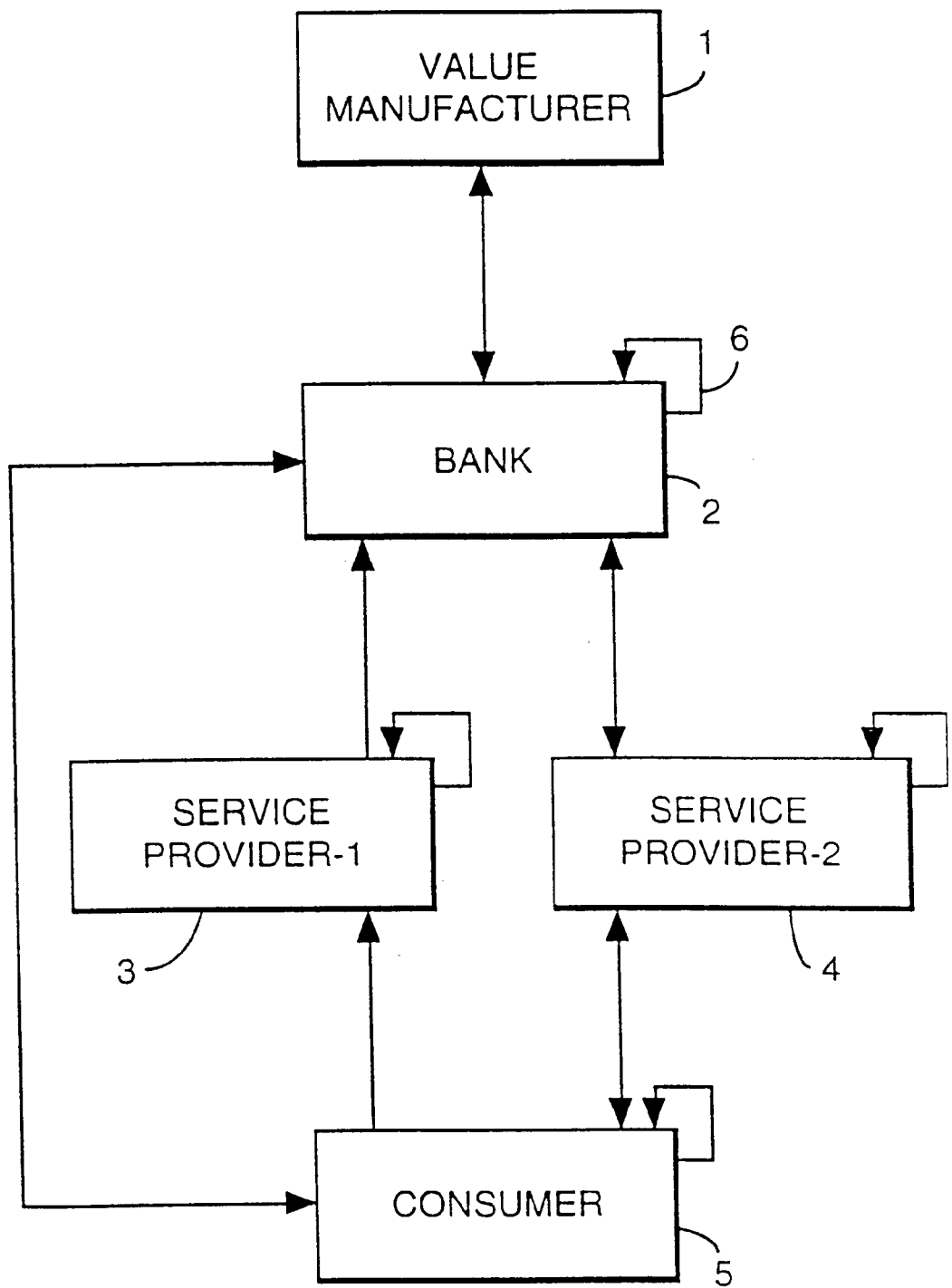

VALUE TRANSFER SYSTEM

CROSS-REFERENCE TO RELATED APPLICATIONS

This application is a continuation of U.S. patent application Ser. No. 08/945,583, filed on Feb. 9, 1998, now abandoned, which was a §371 National Phase Application of PCT/GB96/01104, filed on May 9, 1996.

BACKGROUND OF THE INVENTION

This invention relates to value transfer systems for transferring financial value between electronic purses which are carried by purse carrier devices.

A purse carrier device refers to any device which carries an electronic purse. In the short to medium term the purse carrier device will be a smart card, and this implementation will be assumed through-out the present specification for convenience. However, in the longer term other to implementations are envisaged (the main requirement being tamper resistance) and the present invention is not limited to the smart card option.

Smart cards, also known as IC (integrated circuit) cards, are small plastics cards similar to the well known credit and debit cards but which contain some computing capacity in the form of an IC microprocessor. The smart card includes some form of memory, usually built in to the microprocessor itself. The memory may be of two types: volatile, and non-volatile. The typical smart card will possess both types of memory.

A value transfer system of the type with which the present invention is concerned is described for example in patent application WO 91/16691. This patent application describes a system which provides for the transfer of value equivalent to cash between two smart cards via an interface device, for example in the form of a point of sale device including at least card readers. In this way, goods and services can be paid for in an analogous manner to cash—i.e. without specific reconciliation between the payer and payee accounts.

SUMMARY OF THE INVENTION

In broad terms, the basic system with which the present invention is concerned comprises a plurality of electronic purses and interface devices by which purses may communicate with one another by means of transactions, each of which involves an exchange of electric signals between a pair of purses, one acting as a payer purse and one as a payee purse, said signals being operable to transfer financial value from the payer purse to the payee purse.

Each purse comprises a data area and a computer program for carrying out the purse functions, both being stored in memory within the smart card. The data area contains, amongst other things, a record of the accumulated value currently contained within the purse. That part of the data area of the purse which holds the accumulated value is known as a pocket. A purse may have several pockets, each storing value in a different currency. Unused pockets can contain zero value, or be unassigned within the program. For the purpose of the present specification, it is assumed that the smart card and the purse are effectively the same entity; however, it is possible for a single smart card to carry multiple purses and/or to additionally carry programs for performing other functions not connected with the transfer of electronic cash.

In the present invention, means are provided for more closely controlling the transfer of financial value from one purse to another. It is not at present envisaged that any control needs to be placed on the receipt of value by a purse (although this could change), but there is a need to control the issuance of value by a purse.

To effect this, in accordance with the present invention, each purse is assigned a class in a hierarchical structure, and a record of the class—for example in the form of a number—is stored in the data area of the purse. Also stored in the data area of the purse is a class list, which is a list of those classes to which the purse can transfer value. In a purse which supports more than one currency, there is a class list for each currency. Thus, each purse is assigned a single purse class and includes within its memory one or more purse class lists depending upon the number of currencies supported.

BRIEF DESCRIPTION OF THE DRAWING

The sole FIGURE is a schematic illustration of a value transfer system having different categories of electronic purses in accordance with the teachings of the present invention.

DETAILED DESCRIPTION

It has already been mentioned that the transfer of value between purses proceeds by exchange of electric signals between the two, via the intermediary of an interface device. As explained in some detail in the aforementioned WO 91/16691, the actual transfer is preceded by exchange of various check signals in the form of commands and responses issued by the two purses and by the interface device.

In the present invention these checks additionally include a check on whether the purse class of the payee purse appears in the class list of the payer purse before allowing the transfer to proceed. This can be achieved by passing the purse class of the payee purse via the interface device to the payer purse which latter uses its computing capacity to carry out the necessary check. Integrity is maintained by protecting the purse class cryptographically before it is passed out of the purse to which it belongs. Detail of typical cryptographic methods are described in WO 91/16691; for example, the record of the purse class may be stored in that part of the purse which is signed by the global secret key. However, the mechanism does not depend on any particular cryptographic implementation. It requires only that the payer purse can verify the integrity and authenticity of the purse class it has been sent. In practice, purse class is only one of a number of data items which are protected in this way during a value transfer.

The mechanism has the following benefits:

a. Purse class provides a security and control mechanism, which enables exposure to be limited in a flexible manner, by control of the types of purse to which a given purse can transfer value. For example, this enables purse issuers to limit the opportunities for realising value in a stolen purse by constraining the types of purses it can pay.

b. Purse classes should be considered as forming a hierarchy composed of at least the following major groupings: consumer, service provider, bank, value manufacturer. The ascending hierarchy would typically be associated with an ascending set of value limits. The position in the hierarchy reflects the likely importance of the purse in value terms, and relates to the care which should be exercised in its control.

c. The variability of purse class list by currency enhances the flexibility to control value transfer. Different rules can be supported for different currencies if this is appropriate from a business point of view.

d. The use of purse class category (for example, consumer, service provider, bank) is useful in conjunction with other control measures. For example, in some remote payment scenarios it is vital to know that payment is being made to a bank purse, and not to any other. This can be achieved by verifying the cryptographically protected payee purse class sent from the remote purse.

In this example, four major purse groupings are identified and can be placed in hierarchy order as follows:

Value manufacturer
Bank
Service Provider
Consumer

The Value manufacturer, sometimes known as the originator, is the central bank or equivalent in the country concerned which is responsible for minting and issuing cash. The value manufacturer is at the top of the hierarchy. A service provider is an entity that provides goods or services or equivalent—for example a point of sale device in a shop or garage. The bank and consumer groupings are self-explanatory. Each grouping is given an identifying code, for example a number, which is stored in the purse memory as will be described in more detail below. For example, the following purse class category values will be used herein:

1. Value manufacturer
2. Bank
3. Service Provider
4. Consumer

In an embodiment of the invention, a subset of purse classes, at least one from each of the above groupings, is globally defined to support interworking between groupings (for example, a purse provider must know what minimum set of classes he should allocate in the purse class list for consumer cards, so that they are certain to be able to interwork with service provider and bank purses). Consideration of practical operational scenarios suggests that at least four service provider, three bank, and two consumer purse classes and a single value manufacturer purse class are required. These "global purse classes" may for example be represented symbolically as:

Value manufacturer-1
Bank-1, Bank-2, Bank-3
Service-Provider-1, Service-Provider-2,
Service-Provider-3, Service-Provider-4
Consumer-1, Consumer-2

The following table thus summarises the global purse classes:

| Name | Purse class category | Purse class number |
|---|---|---|
| Value manufacturer-1 | 1 | 1 |
| Bank-1,2,3 | 2 | 1,2,3 |
| Service-Provider-1,2,3,4 | 3 | 1,2,3,4 |
| Consumer-1,2 | 4 | 1,2 |

It will be seen from the above that the purse class is composed of two separate items of information, details of which may be stored in memory as two separate numbers, purse class category and purse class number, in the following format:

Purse class=Purse class category+Purse class number where the purse class category is defined above and the purse class number is the subset number as represented symbolically in the above example.

For example the purse class could be stored in purse memory as a 1 byte number whose first 4 bits represent the purse class category and whose second 4 bits represent the purse class number. This gives the possibility of 16 purse classes which is currently considered adequate, bearing in mind commercial requirements.

The purse class list may be stored, likewise in the memory, as a bit map of 16 bits (2 bytes). For example, assuming the 16 bits are numbered 0 to 15, a four element table offset may be defined such that entries 1, 2, 3 and 4 are bits 0, 2, 6 and 12 respectively. Then a purse class belongs to the class list if and only if bit position:

offset (category)+class number−1 is set.

For example service provider-1 corresponds to bit position 6:

6+1−1=6

Likewise consumer-2 corresponds to bit position 13:

12+2−1=13

Thus a purse in which just bits 6 and 13 of the class list bit map are set will be able to transfer value only to purses having service provider-1 class or consumer-2 class (this example is for the purpose of illustration only—such a purse would not be practicable).

This implementation allows for one spare value manufacturer and Bank purse class and two spare Service Provider and Consumer purse classes.

An example of a simple global purse class scheme will now be described by way of example only and with reference to the accompanying drawing which is a chart summarising the interworking rules between the purse classes of the exemplary scheme.

In the exemplary scheme a limited number of purse classes are defined as follows:

Value manufacturer The most sensitive, highest value purse class. Note that it can only interface with bank purses, and not with service provider or consumer purses.

Bank Used generally for distribution of value to, and receipt of value from consumers, service providers, and banks.

Service-Provider-1 "Standard". This would be configured not to give refunds to consumers, but could pay upwards to bank purses. It can pay its own class, and thus offers options for value movement within purses of the class.

Service-Provider-2 "Refund". This is more capable than the Service Provider-1 purse class, and hence the one with potentially the most exposure. It can pay a consumer for refund purposes, and would be the purse class used for receipt of value from a bank, should this be required. Note, this is the only route for a Service Provider to receive funds from a bank purse.

Consumer The standard consumer purse class, capable of interfacing to the bank purse.

The choice of purse class list is a commercial decision which would normally be made by the purse provider, subject to predetermined rules. Most of the decisions would be made on an understanding of how the service providers or banks to whom they are issuing purses require to operate.

The purse class "rules"—the sets of purse class lists associated with each purse class—are defined for each individual payment scheme. Each purse is "personalised" with the purse class lists applicable to its allocated purse class.

Thus there is a clear separation between the purse class mechanism and the set of rules defined for a payment scheme. Different schemes, with quite different rules, could use exactly the same purse class mechanism.

A summary of the interworking rules between purse classes according to the above rules is given for the exemplary scheme in the chart shown in the accompanying drawing. In the drawing, the global purse classes are indicated by the following reference numerals:

Ref 1: Value manufacturer
Ref 2: Bank
Ref 3: Service provider-1 (standard)
Ref 4: Service provider-2 (refund)
Ref 5: Consumer The arrows indicate the direction in which value can be transferred: thus a double ended arrow, as between the value manufacturer and bank means that value can be transferred both ways between the respective purses. A single ended arrow means that value can be transferred only in one direction, such as between service provider-1 and the bank. An arrow which returns to the same block, such as the arrow 6 associated with block 2 (the bank) means that the respective purse can transfer value to other purses of the same class.

It must be emphasised that the above is a hypothetical set of purse classes and rules, and deliberately does not correspond to any known scheme. In fact, a practical scheme would use many more classes, particularly at the bank and service provider levels.

What is claimed is:

1. A value transfer system comprising a plurality of electronic purses, and interface devices whereby purses may communicate with each other to transfer value by means of transactions, each of which involves an exchange of electric signals between a pair of purses, each purse including memory means storing a record of accumulated value currently contained within the purse, the system being characterized in that each purse is assigned a class in a hierarchical structure and in that said memory means further stores a record of the class of that purse, together with a list of those classes to which that purse tan transfer value, wherein the class list is stored in said memory means as a bit map comprising a pattern of bits, and wherein each category and/or subject within each category is represented by one bit within the pattern of bits, and wherein each class category is given a unique offset within said bit map such that a purse class belongs to the class list only if bit position n within the bit map has a particular value, where:

$$n = \textit{offset} + \textit{subset class number} - 1.$$

2. A value transfer system comprising a plurality of electronic purses, and interface devices whereby purses may communicate with each other to transfer value by means of transactions, each of which involves an exchange of electric signals between a pair of purses, each purse including a memory storing a record of accumulated value currently contained within the purse, the system being characterized in that each purse is assigned to at least one of a plurality of possible groups of purses, wherein each group is defined by a list of the group or groups to which value transfer is permitted when the purse is assigned to that group;

the memory of each purse further stores a record of the identity of the group or groups to which that purse is assigned, together with the corresponding list or lists of the group or groups of purses to which value transfer is permitted whereby the memory record of the group assignment identity of a value transferee purse is compared to the list or lists stored in the memory of a value transferor purse and value transfer is only permitted when a group assignment identified in the transferee purse memory is found in a list of permitted groups stored in the transferor purse memory;

at least a first purse is assigned to a first group which is defined by a list of groups including a second different group wherein said second group is defined by a list of groups which does not include said first group such that said first purse includes a memory record identifying said first group as a group to which said first purse is assigned and a corresponding list including said second group as a group to which value transfer is permitted; and at least a second purse is assigned to said second group such that said second purse includes a memory record identifying said second group as a group to which said second purse is assigned and a corresponding list of groups, not including said first group, to which value transfer is permitted by said second purse whereby said first purse is permitted to transfer value to said second purse, but said second purse is not permitted transfer value to said first purse when said first and second purses are electronically coupled.

3. A value transfer system as claimed in claim 2 wherein at least some of said purses store in their memory a plurality of class lists, each class being assigned to a particular currency.

4. A value transfer system comprising a plurality of electronic purses, and interface devices whereby purses may communicate with each other to transfer value by means of transactions, each of which involves an exchange of electric signals between a pair of purses, each purse including memory means storing a record of accumulated value currently contained within the purse, the system being characterised in that each purse is assigned a class in a hierarchical structure of classes, wherein each class is defined by a list of the class or classes to which value transfer is permitted when the purse is assigned to that class;

the memory of each purse further stores a record of the identity of the class or classes to which that purse is assigned, together with the corresponding list or lists of the class or classes of purses to which value transfer is permitted whereby the memory record of the class assignment identity of a value transferee purse is compared to the list or lists stored in the memory of a value transferor purse and value transfer is only permitted when a class assignment identified in the transferee purse memory is found in a list of permitted classes stored in the transferor purse memory;

at least a first purse is assigned to a first class which is defined by a list of classes including a second different class wherein said second class is defined by a list of classes which does not include said first class such that said first purse includes a memory record identifying said first class as a class to which said first purse is assigned and a corresponding list including said second class as a class to which value transfer is permitted; and at least a second purse is assigned to said second class such that said second purse includes a memory record identifying said second group as a group to which said second purse is assigned and a corresponding list of groups, not including said first group, to which value transfer is permitted by said second purse whereby said first purse is permitted to transfer value to said second purse, but said second purse is not permitted transfer value to said first purse when said first and second purses are electronically coupled.

5. A value transfer system as claimed in claim 4 wherein, in each purse or associated transfer device, is a microprocessor which is programmed so that each value transfer transaction from a payer purse to a payee purse includes at least the step of checking whether the purse class of the payee purse appears on the class list of the payer purse before allowing the transfer of value to take place.

6. A value transfer system as claimed in claim 5 wherein said step of checking comprises passing an electric signal representative of the purse class of the payee purse from the payee purse to the payer purse via an interface device, and carrying out the check in said payer purse.

7. A value transfer system as claimed in claim 6 wherein the information relating to the purse class of the payee purse is cryptographically protected before being passed to the payer purse.

8. A value transfer system as claimed in claim 4 wherein the purse class is representative of a category of purse user, in a hierarchical tree.

9. A value transfer system as claimed in claim 8 wherein said class categories include or comprise any one or more of the following categories:

Value manufacturer;

Bank;

Service Provider;

Consumer; or their equivalent.

10. A value transfer system as claimed in claim 9 wherein the class lists of the respective purses in said categories are such that the value manufacturer purse can only transfer value to and from the bank purse and cannot transfer value directly to or from the service provider purses and/or the consumer purses.

11. A value transfer as claim 8 wherein one or more of said purse categories each includes a subset of purse classes representative of a hierarchy within the category.

12. A value transfer system as claimed in claim 4 wherein the purse class is stored in said memory means as a 1 byte number whose first 4 bits represent the purse class category and whose second 4 bits is a number which represents a subject within the purse class category.

13. A value transfer system as claimed in claim 11 wherein the class list is stored in said memory means as a bit map comprising a pattern of bits, and wherein each category and/or subject within each category is represented by one bit within the pattern of bits.

14. A method for value transfer between a plurality of electronic purses and interface devices whereby purses may communicate with each other to transfer value by means of transactions, each of which involves an exchange of data signals between a pair of purses, each purse including a memory storing a record of accumulated value currently contained within the purse, the method comprising:

assigning each purse to a group of purses, wherein each group is defined by a list of the group or groups to which value transfer is permitted, by storing on the purse a record of the identity of the assigned group together with the corresponding list of groups of purses which define the assigned group;

defining a first group by a list of groups including a second different group;

defining said second group by a list of groups which does not include said first group;

assigning a first purse to said first group such that said first purse includes a memory record identifying said first group as a group to which said first purse is assigned and a corresponding list including said second group as a group to which value transfer is permitted; and assigning a second purse to said second group such that said second purse includes a memory record identifying said second group as a group to which said second purse is assigned and a corresponding list of groups, not including said first group, to which value transfer is permitted by said second purse whereby said first purse is permitted to transfer value to said second purse, but said second purse is not permitted transfer value to said first purse when said first and second purses are electronically coupled.

* * * * *

UNITED STATES PATENT AND TRADEMARK OFFICE
CERTIFICATE OF CORRECTION

PATENT NO. : 6,439,455 B1
DATED : August 27, 2002
INVENTOR(S) : Everett et al.

It is certified that error appears in the above-identified patent and that said Letters Patent is hereby corrected as shown below:

<u>Column 5,</u>
Line 44, delete "tan" and insert therefor -- can --.

<u>Column 6,</u>
Lines 40-42, reformat the text to appear as follows:
-- memory means storing a record of accumulated value
   currently contained within the purse, the system being
   characterized in that
      each purse is assigned a class in a --

Signed and Sealed this

Fourth Day of February, 2003

JAMES E. ROGAN
*Director of the United States Patent and Trademark Office*